United States Patent
Zhang

(10) Patent No.: US 8,757,859 B2
(45) Date of Patent: Jun. 24, 2014

(54) LIGHT BAR FIXING DEVICE AND HELICAL SPRING

(75) Inventor: Tian Zhang, Shenzhen (CN)

(73) Assignee: Shenzhen China Star Optoelectronics Technology Co., Ltd., Shenzhen (CN)

(*) Notice: Subject to any disclaimer, the term of this patent is extended or adjusted under 35 U.S.C. 154(b) by 278 days.

(21) Appl. No.: 13/377,538

(22) PCT Filed: Sep. 17, 2011

(86) PCT No.: PCT/CN2011/079784
§ 371 (c)(1),
(2), (4) Date: Dec. 10, 2011

(87) PCT Pub. No.: WO2013/037140
PCT Pub. Date: Mar. 21, 2013

(65) Prior Publication Data
US 2013/0063959 A1   Mar. 14, 2013

(30) Foreign Application Priority Data
Sep. 13, 2011  (CN) .......................... 2011 2 0341856

(51) Int. Cl.
*F21V 7/04* (2006.01)
(52) U.S. Cl.
USPC ........................... 362/612; 411/425; 411/438
(58) Field of Classification Search
USPC .................................. 362/612; 411/425, 438
See application file for complete search history.

(56) References Cited

U.S. PATENT DOCUMENTS

| 2,755,699 | A  | * | 7/1956 | Forster | 411/438 |
| 6,146,073 | A  | * | 11/2000 | Kobusch | 411/178 |
| 6,726,422 | B2 | * | 4/2004 | Giannakakos | 411/438 |
| 2003/0049096 | A1 | * | 3/2003 | Giannakakos et al. | 411/438 |
| 2005/0238461 | A1 | * | 10/2005 | Lutkus et al. | 411/438 |
| 2008/0008557 | A1 | * | 1/2008 | Bucciero et al. | 411/438 |
| 2008/0232134 | A1 | * | 9/2008 | Weng et al. | 362/612 |

FOREIGN PATENT DOCUMENTS

| CN | 2592954 Y | 12/2003 |
| CN | 201258934 Y | 6/2009 |

OTHER PUBLICATIONS

International Search Report of the PCT Application No. PCT/CN2011/079784, Sep. 13, 2011.

* cited by examiner

*Primary Examiner* — Julie Bannan

(57) ABSTRACT

A light bar fixing device comprises a light bar defining a through-hole and a heat dissipation mechanism defining a threaded hole corresponding to the through-hole. The light bar fixing device further comprises a helical spring having a pitch identical to that of the threaded hole. A columnar body of the helical spring is adapted to be threaded into the threaded hole, and an outer diameter of a stop end of the helical spring is greater than that of the columnar body. By threading the helical spring into the threaded hole, the light bar can be securely connected to the heat dissipation mechanism with a clearance therebetween being reduced. Also, the light bar can dissipate heat evenly via the heat dissipation mechanism to allow a uniform temperature distribution in the light bar, thus resulting in a desirable light emitting effect and a prolonged service life of the light bar.

8 Claims, 3 Drawing Sheets

LIGHT BAR FIXING DEVICE AND HELICAL SPRING

BACKGROUND

1. Technical Field

The present disclosure relates to a fixing device, and more particularly, to a light bar fixing device and a helical spring.

2. Description of Related Art

As a light source of an LED lamp, a light bar generates a large amount of heat in operation. In order to dissipate the heat generated by the light bar, a usual practice is to fix the light bar on a heat dissipation mechanism so that the heat is dissipated by the heat dissipation mechanism to prevent damage or premature failure of the light bar due to overheating.

In the prior art, the light bar is fixed to the heat dissipation mechanism by means of screws. However, this has the following problems: the screws tend to loose in use and the light bar makes poor contact with the heat dissipation mechanism with a clearance existing therebetween, so heat from the light bar is dissipated non-uniformly to cause a non-uniform temperature distribution in the light bar itself. This eventually results in an inconsistent spectrum of the light emitted by the light bar, and even premature failure of the light bar due to local overheating.

BRIEF SUMMARY

The primary objective of the present disclosure is to provide a light bar fixing device and a helical spring that allow for secure connection between the light bar and the heat dissipation mechanism so that a desirable light emitting effect of the light bar can be achieved through uniform heat dissipation from the light bar.

The present disclosure provides a light bar fixing device, which comprises a light bar and a heat dissipation mechanism. The light bar is formed with a through-hole, and the heat dissipation mechanism is formed with a threaded hole at a location corresponding to the through-hole. The light bar fixing device further comprises a helical spring having a pitch identical to that of the threaded hole. A columnar body of the helical spring is adapted to be threaded into the threaded hole, and an outer diameter of a stop end of the helical spring is greater than that of the columnar body.

Preferably, the starting portion of the front end of the helical spring is bent inward to form a straight turning-force applying portion.

Preferably, in the light bar fixing device, a spring wire which forming the helical spring has a thread angle which is greater than that of the threaded hole; and an outer diameter of the columnar body of the helical spring is greater than a major diameter of the threaded hole.

Preferably, an outer diameter of the columnar body of the helical spring is greater than a major diameter of the threaded hole.

Preferably, the columnar body of the helical spring is tapered.

Preferably, coils of the helical springs adjoin each other.

The present disclosure further provides a helical spring which has a pitch identical to that of a threaded hole. A columnar body of the helical spring is adapted to be threaded into the threaded hole, and an outer diameter of the stop end of the helical spring is greater than that of the columnar body.

Preferably, a starting portion of a front end of the helical spring is bent inward to form a straight turning-force applying portion.

Preferably, a spring wire forming the helical spring has a thread angle which is greater than that of the threaded hole.

Preferably, an outer diameter of the columnar body of the helical spring is greater than a major diameter of the threaded hole.

Preferably, the columnar body of the helical spring is tapered.

According to the present disclosure, by threading the helical spring which has a pitch identical to that of a threaded hole of the heat dissipation mechanism into the threaded hole, the light bar can be securely connected to the heat dissipation mechanism with a clearance therebetween being reduced. Because this ensures uniform heat dissipation of the light bar via the heat dissipation mechanism, a uniform temperature distribution can be obtained in the light bar, thus resulting in a desirable light emitting effect and a prolonged service life of the light bar.

Hereinafter, implementations, functional features and advantages of the present disclosure will be further described with reference to embodiments thereof and the attached drawings.

DETAILED DESCRIPTION

It shall be understood that, the embodiments described herein are only intended to illustrate but not to limit the present disclosure.

Figure 1:
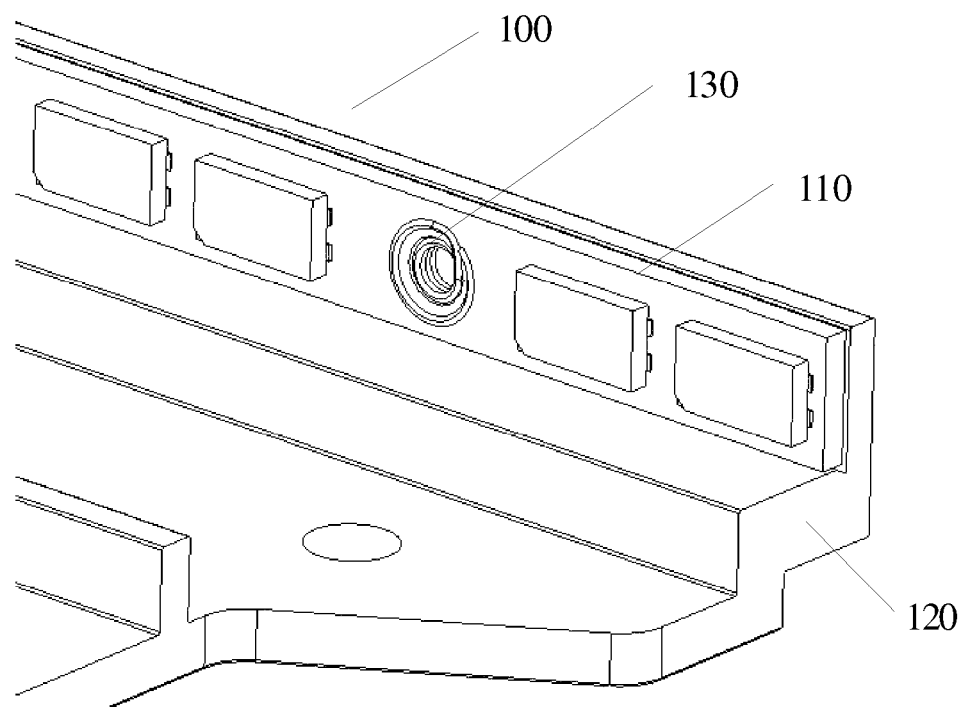
FIG. 1 is a schematic structural view of a light bar fixing device according to a first embodiment of the present disclosure.
Figure 2:
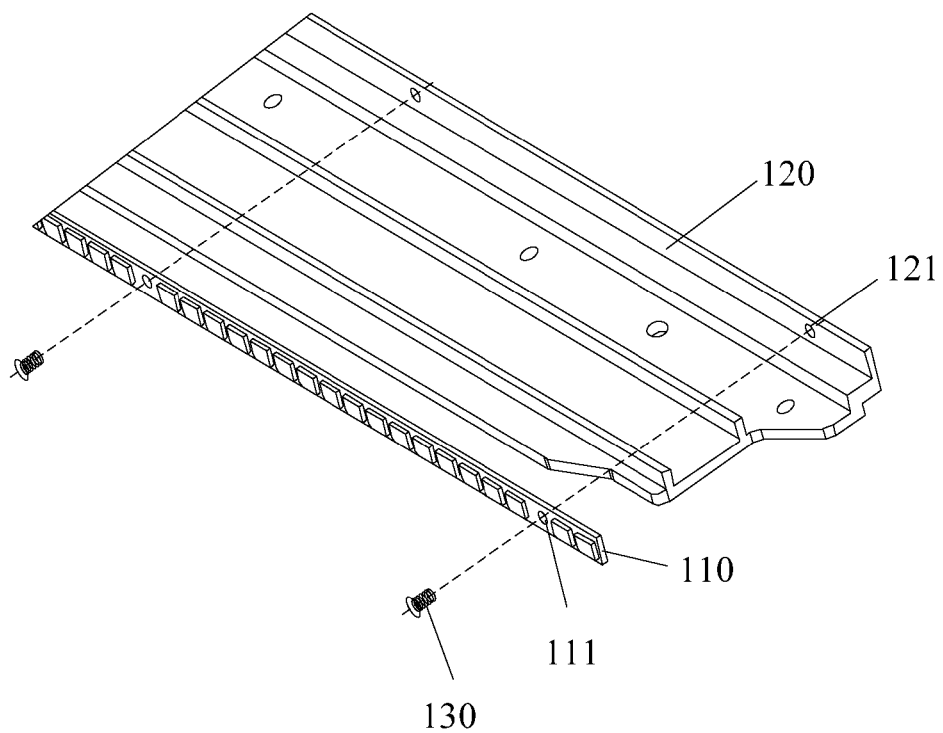
FIG. 2 is another schematic structural view of the light bar fixing device according to a first embodiment of the present disclosure.
Figure 3:
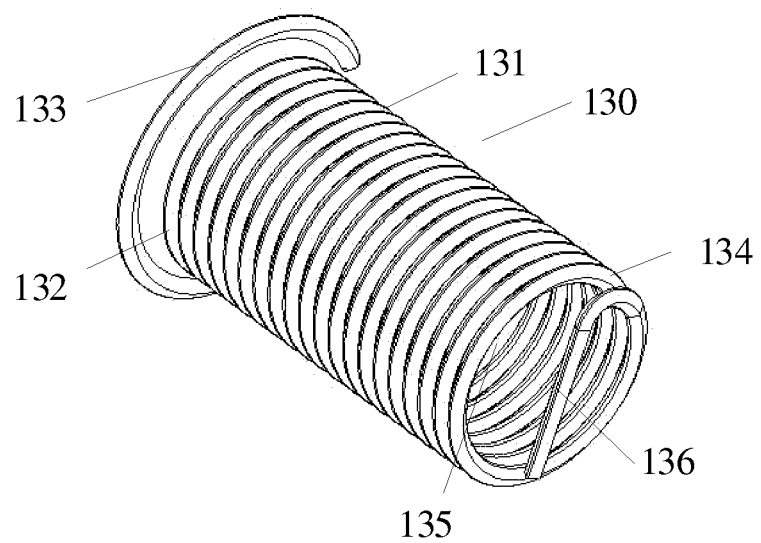
FIG. 3 is a schematic structural view of a helical spring according to a second embodiment of the present disclosure.

Referring to FIG. 1, FIG. 2 and FIG. 3, there is shown a light bar fixing device 100 according to a first embodiment of the present disclosure. The light bar fixing device 100 comprises a light bar 110 and a heat dissipation mechanism 120. The light bar 110 is formed with a through-hole 111, and the heat dissipation mechanism 120 is formed with a threaded hole 121 at a location corresponding to the through-hole 111. The light bar fixing device 100 further comprises a helical spring 130, which has a pitch 131 identical to that of the threaded hole 121. A columnar body of the helical spring 130 is adapted to be threaded into the threaded hole, and a stop end of the helical spring 130 has an outer diameter greater than an outer diameter of the columnar body and is coiled horizontally at the tail end 132.

The stop end 133 may be one or more coils of the helical spring which have an outer diameter greater than the outer diameter of the columnar body. By making the outer diameter of the stop end 133 greater than that of the columnar body, threading of the helical spring 130 into the light bar 110 under the action of an applied force can be stopped at the stop end 133. During installation of the light bar fixing device 100, a front end 134 of the helical spring 130 is inserted through the through-hole 111 of the light bar 110 and is threaded by an applied force into the corresponding threaded hole 121 of the heat dissipation mechanism 120. Once the stop end 133 abuts against the light bar 110, it will be impossible to further thread the helical spring 130 into the heat dissipation mechanism 120.

Further, in the light bar fixing device 100 according to the first embodiment of the present disclosure, a starting portion of the front end 134 of the helical spring 130 is bent inwards to form a straight turning-force applying portion 136.

Figure 4:
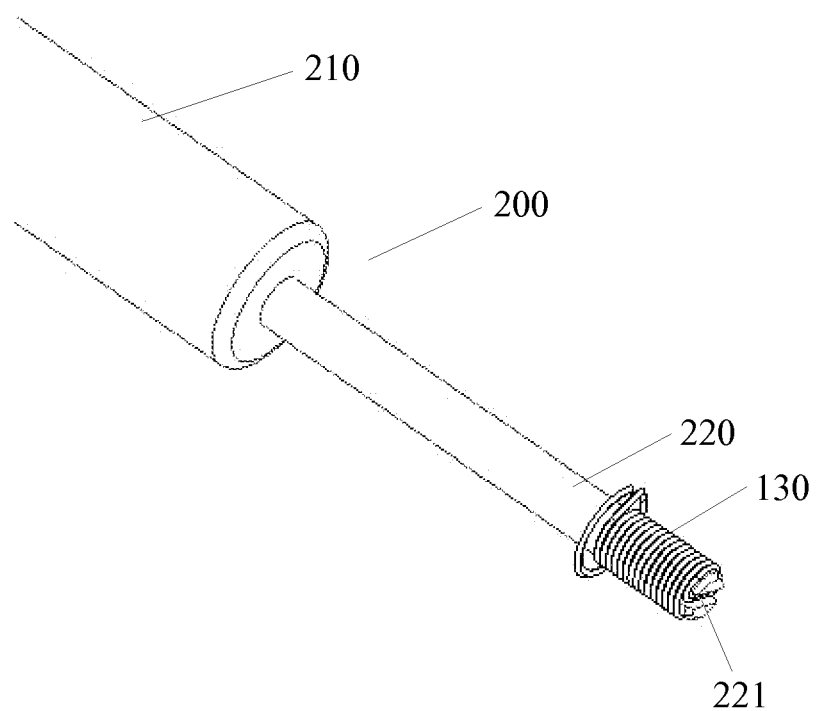
FIG. 4 is a schematic structural view of the helical spring according to the second embodiment of the present disclosure in use.

Referring to FIG. 4, a through-hole 135 is formed between the tail end 132 and the front end 134 of the helical spring 130. By inserting a turning tool 200 into the through-hole 135 to apply a turning force to the turning-force applying portion 136, the helical spring 130 can be threaded into the threaded hole 121 of the heat dissipation mechanism 120 to accomplish secure connection between the light bar 110 and the heat dissipation mechanism 120.

Further, in the light bar fixing device 100, the turning-force applying portion 136 may also be of a cross form, a shape of British "Union Jack", or a polygonal form. The polygonal form may be a triangular form, an equilateral hexagonal form or the like.

Referring to FIG. 4, the turning tool 200 comprises a handheld end 210 and an operational end 220. The operational end 220 is formed with a groove 221 for receiving the turning-force applying end 136. During installation of the light bar fixing device 100, the operational end 220 of the turning tool 200 is inserted into the through-hole 135 of the helical spring 130 in such a way that the groove 221 of the operational end 220 engages with the turning-force applying portion 136. Then, the front end 134 of the helical spring 130 is inserted into the through-hole 111 of the light bar 110 and the handheld end 210 of the turning tool 200 is turned to thread the helical spring 130 into the corresponding threaded hole 121 of the heat dissipation mechanism 120.

Figure 5:
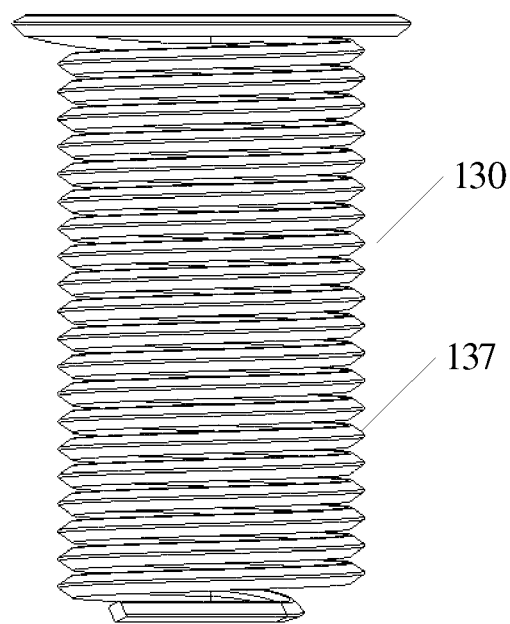
FIG. 5 is another schematic structural view of the helical spring according to the second embodiment of the present disclosure.

Further, referring to FIG. 5, in this embodiment of the light bar fixing device 100, the spring wire forming the helical spring 130 has a thread angle 137, which is equal to or greater than a thread angle of the threaded hole 121. Then, when the helical spring 130 is threaded into the threaded hole 121 by an applied force, the thread angle 137 of the spring wire will abut against the corresponding thread angle of the threaded hole 121 to cause compression deformation of the helical spring 130. Thus, a restoring force will be generated to allow the helical spring 130 to engage with the threaded hole 121 tightly. This makes it less likely for the helical spring to become loose, so secure connection can be maintained between the light bar 110 and the heat dissipation mechanism 120 for a long time. Because this reduces the clearance between the light bar 110 and the heat dissipation mechanism 120, uniform heat dissipation of the light bar 110 can be accomplished through the heat dissipation mechanism 120. As a result, a uniform temperature distribution can be obtained in the light bar 110 to ensure a desirable light emitting effect and a prolonged service life of the light bar 110.

In the first embodiment of the present disclosure, the columnar body of the helical spring 130 may also be made to have an outer diameter greater than a major diameter of the threaded hole 121. In this case, when being threaded into the threaded hole 121, the helical spring 130 is compressed to be deformed by the threaded hole 121 to such an extent that an outer diameter of coils of the helical spring threaded into the threaded hole 121 shrinks to a size of the major diameter of the threaded hole 121. Consequently, a restoring force is generated, thus making the connection between the light bar 110 and the heat dissipation mechanism 120 more secure.

Further, in the aforesaid embodiment of the light bar fixing device 100, the columnar body of the helical spring 130 is tapered; i.e., the columnar body of the helical spring 130 becomes increasingly smaller from the tail end 132 to the front end 134. Therefore, in the process of threading the helical spring 130 into the threaded hole 121, the front end 134 having a smaller outer diameter can be easily threaded into the threaded hole 121; and as the helical spring 130 is continually threaded, an increasingly greater force is needed and the engaging force between the helical spring 130 and the threaded hole 121 also becomes increasingly greater. Correspondingly, the engagement between the helical spring 130 and the threaded hole 121 becomes increasingly tighter. In this way, the light bar 110 is securely connected to the heat dissipation mechanism 120.

Further, in the aforesaid embodiment of the light bar fixing device 100, coils of the helical spring 130 adjoin each other. The helical spring 130 may be winded from a metal wire, with adjacent coils of the helical spring 130 making close contact with each other. A size of the pitch 131 of the helical spring 130 is equal to a distance between every two adjacent coils.

In the aforesaid embodiment of the present disclosure, because of the springy nature of the columnar body of the helical spring 130, the helical spring 130 threaded into the threaded hole 121 is less likely to loose. Therefore, this embodiment can achieve secure connection between the light bar 110 and the heat dissipation mechanism 120 with the clearance therebetween being reduced so that uniform heat dissipation of the light bar 110 is accomplished through the heat dissipation mechanism 120. As a result, a uniform temperature distribution can be obtained in the light bar 110 to ensure a desirable light emitting effect and a prolonged service life of the light bar 110.

Referring further to FIG. 3, a helical spring 130 according to a second embodiment of the present disclosure is shown therein. The helical spring 130 has a pitch 131 identical to that of the threaded hole. A columnar body of the helical spring 130 is adapted to be threaded into the threaded hole, and a stop end 33 of the helical spring 130 has an outer diameter greater than an outer diameter of the columnar body and is coiled horizontally at the tail end 132.

In the aforesaid embodiment of the present disclosure, because of the springy nature thereof, the helical spring 130 threaded into the threaded hole is less likely to loose. Thus, by using the helical spring 130 of this embodiment to fix two separate objects, secure connection can be maintained between the two objects for a long time period. If the helical spring 130 is applied in the light bar fixing device 100, secure connection between the light bar 110 and the heat dissipation mechanism 120 can be achieved to reduce the clearance between the light bar 110 and the heat dissipation mechanism 120. Because this ensures uniform heat dissipation of the light bar 110 through the heat dissipation mechanism 120, a uniform temperature distribution can be obtained in the light bar 110 to ensure a desirable light emitting effect and a prolonged service life of the light bar.

Further, a starting portion of the front end 134 of the helical spring 130 is bent inwards to form a straight turning-force applying portion 136. Here, the helical spring 130 is just that used in the light bar fixing device 100 and, thus, will not be further described herein.

What described above are only preferred embodiments of the present disclosure but are not intended to limit the scope of the present disclosure. Accordingly, any equivalent structural or process flow modifications that are made on basis of the specification and the attached drawings or any direct or indirect applications in other technical fields shall also fall within the scope of the present disclosure.

The invention claimed is:

1. A light bar fixing device, comprising a light bar and a heat dissipation mechanism, wherein the light bar is formed with a through-hole, and the heat dissipation mechanism is formed with a threaded hole at a location corresponding to the through-hole, and the light bar fixing device further comprises a helical spring having a pitch identical to that of the threaded hole, a columnar body of the helical spring is adapted to be threaded into the threaded hole, the helical spring comprises a columnar body and a stop end, the columnar body is tapered and comprises a front end and a tail end opposite to the front end, an outer diameter of the columnar body gradually increases from the front end to the tail end, and a starting portion of the front end is bent inward to form a straight turning-force applying portion; the stop end is connected to the tail end and has an outer diameter greater than that of the columnar body.

2. The light bar fixing device of claim 1, wherein coils of the helical springs adjoin each other.

3. The light bar fixing device of claim 1, wherein coils of the helical springs adjoin each other.

4. The light bar fixing device of claim 1, wherein: a spring wire forming the helical spring has a thread angle which is greater than that of the threaded hole; and an outer diameter of the columnar body of the helical spring is greater than a major diameter of the threaded hole.

5. The light bar fixing device of claim 4, wherein coils of the helical springs adjoin each other.

6. A helical spring, having a pitch identical to that of a threaded hole, wherein the helical spring comprises a columnar body and a stop end, the columnar body is tapered and comprises a front end and a tail end opposite to the front end, an outer diameter of the columnar body gradually increases from the front end to the tail end, and a starting portion of the front end is bent inward to form a straight turning-force applying portion; the stop end is connected to the tail end and has an outer diameter greater than that of the columnar body.

7. The helical spring of claim 6, wherein: a spring wire forming the helical spring has a thread angle which is greater than that of the threaded hole.

8. The helical spring of claim 6, wherein an outer diameter of the columnar body of the helical spring is greater than a major diameter of the threaded hole.

* * * * *